United States Patent
Kossentini et al.

(10) Patent No.: US 10,029,782 B2
(45) Date of Patent: Jul. 24, 2018

(54) ACTUATOR SYSTEM FOR AIRCRAFT CONTROL SURFACE

(71) Applicant: Airbus Operations S.A.S., Toulouse (FR)

(72) Inventors: Chiheb Kossentini, Toulouse (FR); Nicholas Larrieu, L'isle Jourdain (FR); Mathieu Delabre, Tournefeuille (FR); Xavier Pol, Toulouse (FR)

(73) Assignee: Airbus Operations S.A.S. (FR)

( * ) Notice: Subject to any disclaimer, the term of this patent is extended or adjusted under 35 U.S.C. 154(b) by 811 days.

(21) Appl. No.: 14/682,232

(22) Filed: Apr. 9, 2015

(65) Prior Publication Data

US 2017/0057620 A1 Mar. 2, 2017

(30) Foreign Application Priority Data

Apr. 16, 2014 (FR) ...................... 14 53386

(51) Int. Cl.
  *B64C 13/44* (2006.01)
  *B64C 9/02* (2006.01)
  *B64C 13/50* (2006.01)
  *G01D 5/22* (2006.01)
(52) U.S. Cl.
  CPC ............. *B64C 13/44* (2013.01); *B64C 9/02* (2013.01); *B64C 13/503* (2013.01); *G01D 5/2291* (2013.01); *B64C 13/504* (2018.01)
(58) Field of Classification Search
  CPC ........... B64C 9/02; B64C 13/16; B64C 13/08; B64C 13/22; B64C 13/44; B64C 13/46; B64C 13/503; B64C 2013/506; G01D 5/2291; G05D 1/0066

USPC ........................................................ 244/99.2
See application file for complete search history.

(56) References Cited

U.S. PATENT DOCUMENTS

| | | | | |
|---|---|---|---|---|
| 4,649,484 A | * | 3/1987 | Herzog | ............... B64C 13/503 244/194 |
| 5,424,950 A | * | 6/1995 | Jackson | ............... G05D 1/0833 244/192 |
| 5,493,497 A | * | 2/1996 | Buus | ................... B64C 13/503 244/194 |
| 7,098,619 B2 | * | 8/2006 | Stridsberg | ............... B64C 13/00 244/195 |

(Continued)

FOREIGN PATENT DOCUMENTS

| | | |
|---|---|---|
| EP | 2 551 191 A1 | 1/2013 |
| FR | 2 966 124 A1 | 4/2012 |
| FR | 2 983 456 A1 | 6/2013 |

OTHER PUBLICATIONS

FR 14 53386 Search Report dated Dec. 23, 2014.

*Primary Examiner* — Richard R Green
*Assistant Examiner* — Brady W Frazier
(74) *Attorney, Agent, or Firm* — Lerner, David, Littenberg, Krumholz & Mentlik, LLP

(57) ABSTRACT

An actuator system includes an actuator which is configured to generate a loading on a control surface, as a function of an actuation order received, a command unit of the actuator, which is configured to compute an actuation order of the actuator, a reception element for receiving a current value of the loading generated by the actuator, and a limitation unit configured to reduce the control authority of the command unit as a function of the current value of the loading and to limit the loading of the actuator to a predetermined setpoint value.

4 Claims, 2 Drawing Sheets

(56) References Cited

U.S. PATENT DOCUMENTS

| | | | | |
|---|---|---|---|---|
| 9,242,723 B2* | 1/2016 | Wildschek | ............... | B64C 13/16 |
| 2009/0292405 A1* | 11/2009 | Najmabadi | ............. | B64C 13/16 |
| | | | | 701/3 |
| 2010/0078518 A1* | 4/2010 | Tran | ........................ | B64C 13/16 |
| | | | | 244/87 |
| 2010/0127132 A1* | 5/2010 | Kirkland | ................. | B64C 13/42 |
| | | | | 244/76 R |
| 2011/0251739 A1* | 10/2011 | Tomas | ................... | B64C 13/503 |
| | | | | 701/3 |
| 2011/0266399 A1* | 11/2011 | Blanc | ................... | G05D 1/0066 |
| | | | | 244/76 C |
| 2013/0026287 A1* | 1/2013 | Goupil | .................... | B64C 13/50 |
| | | | | 244/99.9 |
| 2013/0116863 A1* | 5/2013 | Goupil | ................. | G01M 17/00 |
| | | | | 701/14 |
| 2013/0192453 A1* | 8/2013 | Bonny | ................. | B64C 13/503 |
| | | | | 91/1 |

* cited by examiner

ACTUATOR SYSTEM FOR AIRCRAFT CONTROL SURFACE

FIELD OF THE INVENTION

The present invention relates to an actuator system for an aircraft control surface and a method of commanding an actuator of such an actuator system.

It is known that a system of electric flight controls of an aircraft, in particular of a transport airplane, controls actuators which make it possible to generate a movement (for example a pivoting) of control surfaces such as an elevator, a rudder or an aileron, so as to pilot the aircraft.

The present invention applies to an actuator which is intended to actuate such an aircraft control surface. This actuator can be a hydraulic power servocontrol. It may also be an electro-hydrostatic actuator, in particular of EHA ("Electro-Hydrostatic Actuator") type, or an electrical backup hydraulic actuator, of EBHA ("Electrical Backup Hydraulic Actuator") type.

BACKGROUND OF THE INVENTION

A control surface actuator must respond to performance requirements (speed and loading to counter the aerodynamic loading applied on the associated control surface) without, however, getting damaged, and without damaging the structure on which it acts or on which it is mounted.

On account of its technology, such an actuator is capable of locally producing more loading than the maximum level necessary for its operation. The risk therefore exists that the structure on which the actuator is mounted is subjected to more sizable loadings than the level for which it was dimensioned. Hence, to protect this structure, the actuators are, generally, equipped with a passive mechanical device for commanding loading, namely an overpressure valve of PRV ("Pressure Relief Valve") type, which limits the loading generated by the actuator.

However, with such a device, the loading produced or taken up by the actuator is dependent on the speed of the actuator. Hence, when the loading produced or taken up by the actuator is greater than the loadings that can be supported by the associated structure, this passive loading commanding device is not sufficient, because of its dependency with the speed of the actuator.

Too sizable a loading produced or taken up by the actuator may in particular be generated by a fault with the control of the actuator, by contact with another surface, by an embarkation of another actuator or by other exterior circumstances.

BRIEF SUMMARY OF THE INVENTION

The present invention relates to an actuator system for an aircraft control surface, which may remedy the aforementioned drawback.

For this purpose, according to an embodiment of the invention, said actuator system comprising:
- at least one actuator which is configured to generate a loading, as a function of an actuation order received; and
- a command unit for the actuator, which is configured, on the one hand, to receive a control signal and an indication of position of the control surface, and on the other hand, to compute an actuation order with the aid of said control signal and of said position indication, said actuation order being transmitted to said actuator, is noteworthy in that it comprises a reception element for receiving a current value of the loading generated by the actuator, and in that the command unit comprises a limitation unit configured to limit and command the loading generated by the actuator, said limitation unit comprising:
- a first unit configured to reduce the control authority of the command unit, as a function of said current value of the loading; and
- a second unit configured to limit the loading of the actuator to a predetermined setpoint value.

Thus, by virtue of the invention, a limitation unit is available making it possible to limit and to command, in an active manner, the loading produced (or taken up) by the actuator, both while reducing the control authority if necessary, and while limiting the loading to a predetermined setpoint value, as specified hereinbelow, thereby making it possible to remedy the aforementioned drawback. An actuator system is thus obtained which is provided with an actuator which makes it possible to respond to performance requirements, without, however, getting damaged, and without damaging the structure on which it acts or on which it is mounted.

Within the framework of the present invention, for simplification reasons, the loading "generated" by the actuator can correspond to the loading produced (or engendered) by the actuator, and also to the loading taken up by the actuator.

In a preferred embodiment, the first unit (of the limitation unit) comprises:
- a computation element configured to compute a value of gain, as a function of a predetermined gain table and of said current value of the loading, received from the reception element; and
- a computation element configured to apply said gain to said actuation order, before transmitting this actuation order (thus modified) to said actuator.

Furthermore, advantageously, the second unit (of the limitation unit) comprises:
- a first computation element for comparing the current value of the loading received from the reception element, with said setpoint value;
- a second computation element for computing a corrective term, if said current value of the loading is greater than said setpoint value; and
- a third computation element for applying the corrective term to said actuation order, before transmitting this actuation order (thus modified) to said actuator.

Moreover, in a particular embodiment, said actuator system comprises, additionally, an activation unit comprising:
- an auxiliary reception element configured to receive a current value of at least one parameter relating to at least one movement able to be linked to said actuator;
- a verification element configured to verify, with the aid at least of said current value, whether at least one activation condition is fulfilled; and
- activation elements configured to activate the first and second units when said at least one activation condition is fulfilled.

Furthermore, advantageously, said actuator system comprises, additionally, at least one sensor configured to measure a current loading generated by the actuator and transmit a corresponding current value.

The present invention also relates to a chain for positional slaving of a control surface (aileron, rudder, elevator, etc.) of an aircraft, in particular of a transport airplane. This slaving chain which comprises:
- said control surface which is movable, and whose position is adjusted by at least one actuator;

at least one position sensor which measures the effective position of said control surface and which emits a position indication corresponding to this effective position;

said actuator which is configured to generate a loading, as a function of an actuation order received, so as to adjust the position of the control surface; and a command unit for the actuator, which is configured, on the one hand, to receive a control signal and said position indication, and on the other hand, to compute an actuation order with the aid of said control signal and of said position indication, said actuation order being transmitted to said actuator, is noteworthy in that said actuator and said command unit form part of an actuator system such as that aforementioned.

The present invention pertains, furthermore, to a system of electric flight controls of an aircraft, said system comprising at least one control unit for producing a control signal for at least one control surface of the aircraft and at least one chain for positional slaving of this control surface, such as that aforementioned.

The present invention also relates to an aircraft, in particular a transport airplane, which comprises an actuator system, a slaving chain and/or a system of electric flight controls, such as those described hereinabove.

Moreover, the present invention also pertains to a method of commanding an actuator forming part of an actuator system of an aircraft control surface, said control surface being movable and its position being adjusted by way of a loading generated by the actuator, said actuator being configured to generate a loading as a function of an actuation order received.

According to an aspect of the invention, said method comprising steps consisting:

in receiving a control signal and an indication of position of the control surface; and in computing an actuation order, with the aid of said control signal and of said position indication, said actuation order being transmitted to said actuator, is noteworthy in that it comprises, additionally, a step of receiving a current value of the loading generated by the actuator and a limitation step to limit and command the loading generated by the actuator, the limitation step consisting:

in reducing the control authority to actuate the actuator, as a function of said current value of the loading; and in limiting the loading of the actuator to a predetermined setpoint value.

In a preferred embodiment, said method comprises an activation step consisting:

in receiving a current value of at least one parameter relating to at least one movement able to be linked to the actuator;

in verifying, with the aid at least of this current value, whether at least one activation condition is fulfilled; and if said at least one activation condition is fulfilled, in activating (or triggering) the implementation of the limitation step.

BRIEF DESCRIPTION OF THE DRAWINGS

The appended figures will elucidate the manner in which the invention may be embodied. In these figures, identical references designate similar elements.

DETAILED DESCRIPTION

Figure 1:
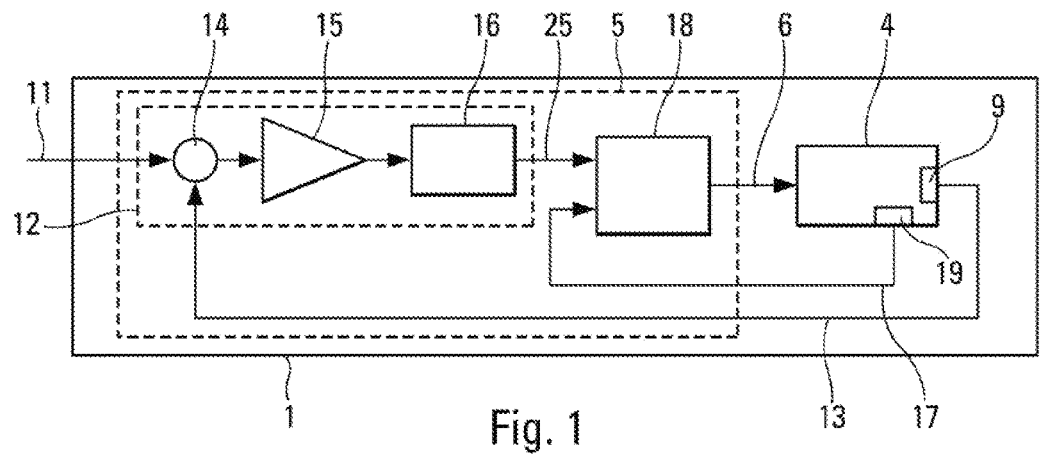
FIG. 1 is the schematic diagram of a particular embodiment of an actuator system in accordance with the invention.

The actuator system 1 illustrating an embodiment of the invention and represented schematically in FIG. 1 is intended to actuate (that is to say to move, in particular to pivot) a control surface 3 (FIG. 2) of an aircraft (not represented), in particular of a transport airplane, so as in particular to pilot the aircraft.

This actuator system 1 comprises:

an actuator 4 which is configured to generate in a standard manner a loading, as a function of an actuation order received; and a command unit 5 for the actuator 4, which is configured:
on the one hand, to receive a control signal and an indication of position of the control surface 3; and
on the other hand, to compute an actuation order with the aid of said control signal and of said position indication, said actuation order being transmitted to said actuator 4 via a link 6.

Figure 2:
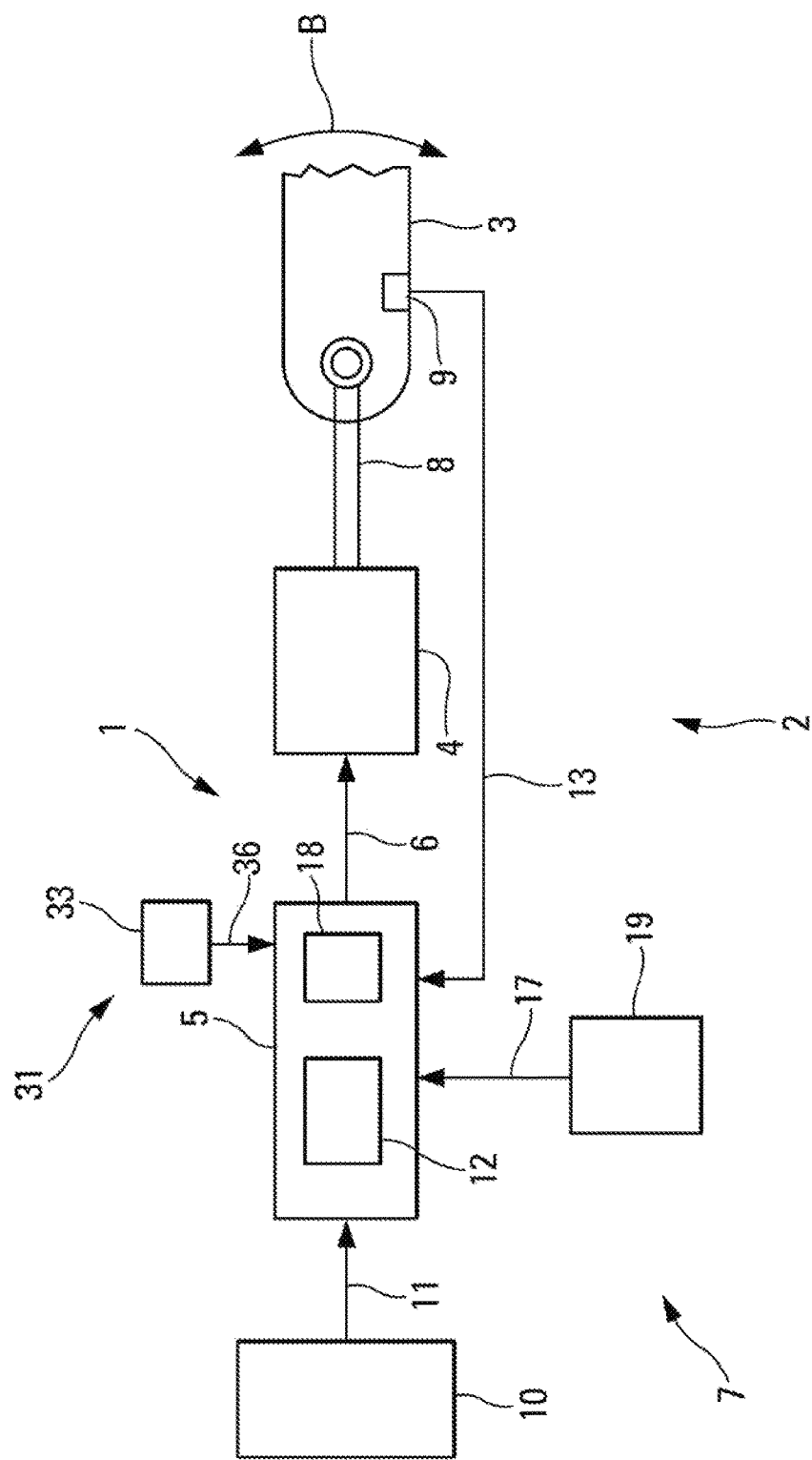
FIG. 2 schematically illustrates a system of electric flight controls, to which the present invention is applied.

The actuator system 1 forms part of a positional slaving chain 2 (represented in FIG. 2). The control surface 3 (for example an aileron, a spoiler, an elevator, a rudder, etc.) is slaved positionally by the slaving chain 2.

In a standard manner, this slaving chain 2 forms part of a system of electric flight controls 7 of the aircraft and comprises:

said control surface 3 (represented partially in FIG. 2) which is movable, by being able to be deflected, as illustrated by a double arrow B in FIG. 2, and whose position with respect to the structure of the aircraft is adjusted by the actuator 4;

said actuator 4 which adjusts the position of said control surface 3, for example by way of a rod 8 which acts on the latter, as a function of at least one actuation order received by way of the link 6;

at least one sensor 9 which measures the effective position of said control surface 3. For this purpose, this may be a sensor 9 which is directly associated with the control surface 3, for example of RVDT (for "Rotary Variable Differential Transducer") type, and/or a sensor, not represented, for example of LVDT (for "Linear Variable Differential Transducer") type, which measures for example the displacement of the rod 8 of the actuator 4; and the command unit 5 which forms, for example, part of a flight controls computer.

This command unit 5:

receives a control signal from a standard control unit 10, by way of a link 11. This control unit 10 is a standard unit for generating control signals and comprises, for example, a control stick which is able to be actuated by a pilot of the aircraft, as well as inertial sensors;

receives a position indication indicating the effective position measured by the sensor or sensors 9, by way of a link 13, via an input of analog or digital type;

formulates, in a standard manner, an actuation order for the control surface 3, with the aid of an integrated computation assembly 12. This computation assembly 12 contains piloting laws and uses for this formulation, in particular the control signal (relating for example to the action of the pilot on the control stick) received from said control unit 10, and the position indication received from the sensor 9; and transmits this actuation order (in the form of a slaving command) to a control means (for example a servo-valve or an electric motor) of the actuator 4, by way of the link 6 via an output of analog or digital type.

The computation assembly 12 comprises in a standard manner, as represented in FIG. 1:
- a computation element 14 which computes the difference between the control signal received through the link 11 and the position indication received through the link 13;
- a computation element 15 which multiplies this difference by a gain; and
- a computation element 16 which filters the result provided by the computation element 15.

The computation element 16 generates an electric current representing an actuation order.

The computation assembly 12 therefore receives an (electrical) control signal by way of the link 11 and converts this electrical control signal into an actuation order, for example a setpoint value (of speed) for an electric motor of the actuator 4.

The system of electric flight controls 7 comprises at least one control unit 10 for producing a control signal for at least one control surface 3 and at least one positional slaving chain 2 of this control surface 3.

According to the invention, said actuator system 1 comprises, furthermore, an element (link 17) for receiving a current value of the loading generated by the actuator 4.

Moreover, according to the invention, the command unit 5 comprises a limitation unit 18 configured to limit and command the loading generated by the actuator 4. This limitation unit 18 comprises, as represented in FIG. 3:
- a unit 20 configured to reduce the control authority of the command unit 5, as a function of said current value of the loading; and
- a unit 21 configured to limit the loading of the actuator 4 to a setpoint value.

Said actuator system 1 comprises, additionally, at least one sensor 19 configured to measure a current loading generated by the actuator 4 and transmit a corresponding current value (via the link 17). This sensor 19 may, for example, be a piezo-electric sensor or a sensor of LVDT (for "Linear Variable Differential Transducer") type.

Thus, the actuator system 1 has a limitation unit 18 making it possible to limit and to command, in an active manner, the loading produced by the actuator 4 on the control surface 3, both while reducing the control authority if necessary, and while limiting the loading to a predetermined setpoint value. An actuator system 1 is thus obtained which is provided with an actuator 4 which makes it possible to respond to performance requirements, without, however, getting damaged, and without damaging the structure on which it acts or on which it is mounted.

Figure 3:
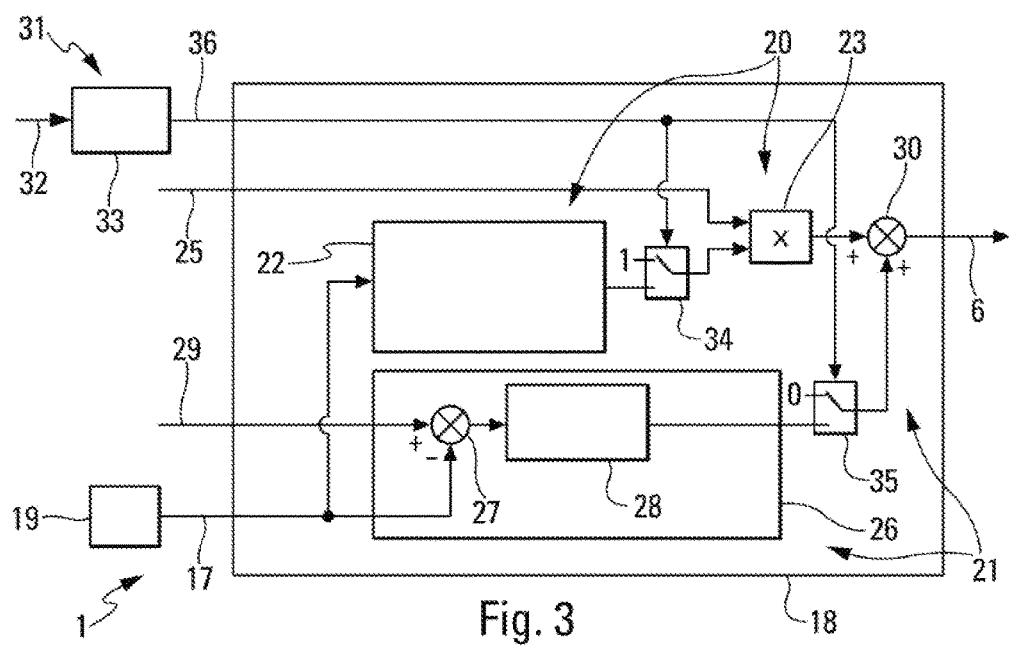
FIG. 3 schematically shows means forming part of the actuator system of FIG. 1.

Moreover, the unit 20 of the limitation unit 18 comprises, as represented in FIG. 3:
- a computation element 22 configured to compute a value of gain G, as a function of a predetermined (recorded) gain table and of said current value of the loading, received via the link 17; and
- a computation element 23 configured to apply the gain G (generated by the computation element 22) to the actuation order received via a link 25 of the computation assembly 12.

The computation element 23 multiplies the value representative of the actuation order (generated by the computation assembly 12) by the gain G.

Figure 4:
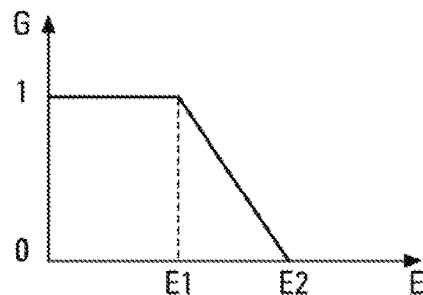
FIG. 4 is a graphic making it possible to explain a function implemented by an actuator system.

The gain G (or reducing coefficient) exhibits a value lying between 1 and a value V1 less than 1 (this value V1 possibly being equal to 0 but not necessarily), as a function of the current value E (received via the link 17) of the loading and of predetermined values E1 and E2 such as those represented in FIG. 4.

Thus:
- as long as the value of the loading E is less than or equal to a first predetermined value E1, the gain is equal to 1, that is to say the actuation order received via the link 25 (and multiplied by 1) remains unchanged;
- when the value of the loading E varies from the first value E1 to a second predetermined value E2 (greater than the value E1), the gain G varies from 1 to a value V1 less than 1 (this value V1 possibly being equal to 0 as represented in FIG. 4, but not necessarily). This variation is linear in the example of FIG. 4. It may also exhibit another form. In this case, the actuation order is reduced by said gain G; and
- if the current value of the loading E is greater than or equal to the value E2, the gain G is zero, that is to say the actuation order becomes zero.

The values E1 and E2, as well as the evolution of the curve G between these values E1 and E2, are determined in an empirical manner, in particular by computing theoretical values which are thereafter refined by trials.

Moreover, the unit 21 of the limitation unit 18 comprises, as represented in FIG. 3:
- a computation element 26 for comparing the current value of the loading generated by the actuator 4 with said setpoint value of the loading (received through a link 29) and for computing a corrective term, if the current value is greater than the setpoint value; and
- a computation element 30 for applying said corrective term to said actuation order received from the computation element 23 of the unit 20.

The computation element 30 adds the corrective term to the actuation order received.

This corrective term:
- is zero, as long as the current value of the loading is less than or equal to the setpoint value; and
- becomes negative (or positive as a function of the sign convention used) so as to limit the loading of the actuator 4 to a setpoint value, when the current value of the loading is greater than the setpoint value.

Said loading setpoint value, which is received through a link 29 and which is for example stored in a memory of the actuator system 1, is suitable for the envisaged application. Preferably, it is determined in an empirical manner, in particular by computing a theoretical value which is thereafter refined by trials.

In a particular embodiment, the computation element 26 comprises, as represented in FIG. 3, a means 27 for computing the difference between the current value of the loading and the setpoint value of the loading and a correction and limitation means 28.

Moreover, the actuator system 1 comprises, additionally, as represented in FIGS. 2 and 3, an activation unit 31 which comprises:
- a reception element (link 32) for receiving the current value of at least one parameter relating to a movement able to be linked to said actuator 4. The activation unit 31 can also comprise measurement elements for measuring this parameter;

a verification element 33 configured to verify, with the aid of said current value received via the link 32, whether at least one activation condition is fulfilled (otherwise, an inactivation situation prevails); and activation elements 34 and 35 connected via a link 36 to the verification element 33 and configured to activate the units 20 and 21 when said at least one activation condition is fulfilled.

The activation elements 34 and 35 are switching means which are controlled by the verification element 33 via the link 36. More precisely:

the activation element 34 brings the second input of the computation means 23:

to a value 1 (so that the actuation order, computed by the computation assembly 12 and received at the first input via the link 25, remains unchanged), in case of an inactivation situation; and to the output of the computation element 26, in case of activation; and the activation element 35 brings the second input of the computation means 30:

to a value 0 (so that the actuation order, received at the first input of the computation element 23, remains unchanged), in case of an inactivation situation; and to the output of the computation element 26 in case of activation.

The parameter relating to a movement able to be linked to said actuator 4, whose current value is received via the link 32, can be a parameter which measures the movement (or which is representative of the movement) of the control surface 3 or of the rod 8 of the actuator 4 or else of any other structural element, whose movement (or displacement) is related to the movement, generated by the actuator 4, of the control surface 3. This may, for example, be a parameter detecting the movement of an aircraft flap, whose displacement is followed by a spoiler (control surface 3) displaced by an actuator 4.

Moreover, said actuator 4 can be a hydraulic power servocontrol. It may also be an electro-hydrostatic actuator, in particular of EHA ("Electro-Hydrostatic Actuator") type, which comprises in a standard manner, an electronic module, an electric motor, a hydraulic pump, an overpressure valve, a hydraulic block and a hydraulic ram. A local slaving in the electronic module converts a control current into a speed setpoint for the electric motor which drives the hydraulic pump using electrical power provided by the aircraft. The pump then locally produces hydraulic power to displace the hydraulic ram. It may also be an electrical backup hydraulic actuator, of EBHA ("Electrical Backup Hydraulic Actuator") type, when it operates in electrical mode. This EBHA actuator is a hybrid actuator comprising the characteristics both of a standard hydraulic servocontrol and of an electro-hydrostatic actuator of EHA type. In a nominal situation (no fault), the EBHA actuator operates as a standard servocontrol. On the other hand, in case of a fault affecting the hydraulic mode, this EBHA actuator passes to electrical mode and operates as an EHA actuator.

The limitation unit 18 of the actuator system 1 therefore makes it possible to limit and command the loading of the actuator 4 in the case of interaction loadings greater than those that can be supported by the associated structure. This limitation unit 18 is nested in the positional command loop for the control surface 3. The limitation unit 18 implements two functions, namely:

reducing the control authority of the positional slaving loop; and formulating a new control which regulates the loading of the actuator 4 to a setpoint value.

Within the framework of the present invention, the command unit 5 which contains the limitation unit 18 can form part of the actuator 4 or can be integrated into a computer, in particular a flight controls computer.

The present invention can be applied to various aircraft control surface actuators, and in particular to actuators of spoilers of a transport airplane.

It is known that, on a transport airplane, during the deployment or during retraction of a flap, an associated spoiler follows the flap so as to keep a slot between its trailing edge and the leading edge of the flap. However, a fault or a succession of faults may bring the spoiler into contact with the flap and therefore generate sizable loadings in the structure during retraction of the flap. These loadings, if they are not managed, may produce damage to the structure. In such an application, the aim of the limitation unit 18 is therefore to reduce the authority of the control of the positional slaving loop (which brought the spoiler (control surface 3) to an erroneous position) and to formulate a new control as a function of the loading of the actuator 4, and this will allow the extension of the spoiler (control surface 3) while regulating the loading to a setpoint value.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An actuator system for an aircraft control surface, said system comprising:

at least one actuator configured to generate a loading, as a function of an actuation order received;

a command unit of the at least one actuator configured to receive a control signal and an indication of position of the control surface, and to compute an actuation order with the aid of said control signal and of said position indication, said actuation order being transmitted to said at least one actuator; and an activation unit comprising:

an auxiliary reception element configured to receive a current value of at least one parameter relating to at least one movement able to be linked to said at least one actuator;

a verification element configured to verify, with the aid at least of said current value, whether at least one activation condition is fulfilled; and activation elements, wherein said at least one actuator comprises:

at least one sensor configured to measure a current loading generated by the at least one actuator and to transmit a corresponding current value; and a reception element for receiving the current value of the loading generated by the at least one actuator, wherein the command unit comprises a limitation unit configured to limit and command the loading generated by the actuator, said limitation unit comprising:
  a first unit configured to reduce the control authority of the command unit, as a function of said current value of the loading; and
  a second unit configured to limit the loading of the actuator to a predetermined setpoint value,
wherein the first unit comprises:
  a first computation element configured to compute a value of gain, as a function of a predetermined gain table and of said current value of the loading, received from the reception element; and
  a second computation element configured to apply said gain to said actuation order, before transmitting said actuation order to said at least one actuator;
wherein the activation elements are configured to activate the first and second units when said at least one activation condition is fulfilled.

2. The system as claimed in claim 1, wherein the second unit comprises:
  a third computation element for comparing the current value of the loading received from the reception element, with said setpoint value;
  a fourth computation element for computing a corrective term, if said current value of the loading is greater than said setpoint value; and
  a fifth computation element for applying the corrective term to said actuation order, before transmitting said actuation order to said actuator.

3. A chain for positional slaving of an aircraft control surface, said slaving chain comprising:
  at least one actuator system according to claim 1;
  said control surface which is movable, and whose position is adjusted by said at least one actuator;
  at least one position sensor for measuring the effective position of said control surface and for emitting a position indication corresponding to the effective position;
  wherein said at least one actuator is configured to generate a loading, as a function of an actuation order received, so as to adjust the position of the control surface; and
  a command unit of the at least one actuator configured to receive a control signal and said position indication, and to compute an actuation order with the aid of said control signal and of said position indication, said actuation order being transmitted to said at least one actuator.

4. A system of electric flight controls of an aircraft, said system comprising:
  at least one control unit for producing a control signal for at least one control surface of the aircraft; and
  at least one chain for positional slaving of the control surface according to claim 3.

* * * * *